(12) United States Patent
Brininstool et al.

(10) Patent No.: US 8,413,107 B2
(45) Date of Patent: Apr. 2, 2013

(54) ARCHITECTURE FOR SERVICE ORIENTED ARCHITECTURE (SOA) SOFTWARE FACTORIES

(75) Inventors: Cecil A. Brininstool, Flower Mound, TX (US); Lawrence F. Schmidt, Rutledge, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1131 days.

(21) Appl. No.: 12/218,469

(22) Filed: Jul. 15, 2008

(65) Prior Publication Data

US 2010/0017783 A1    Jan. 21, 2010

(51) Int. Cl.
G06F 9/44    (2006.01)
(52) U.S. Cl. ........ 717/104; 717/106; 717/108; 717/120; 709/203; 709/219; 709/220
(58) Field of Classification Search ........................ None
See application file for complete search history.

(56) References Cited

U.S. PATENT DOCUMENTS

| | | | | |
|---|---|---|---|---|
| 7,979,840 | B2* | 7/2011 | Zhang et al. | 717/104 |
| 2004/0249645 | A1* | 12/2004 | Hauser et al. | 705/1 |
| 2005/0132381 | A1* | 6/2005 | Fiammante et al. | 719/310 |
| 2005/0193269 | A1* | 9/2005 | Haswell et al. | 714/38 |
| 2005/0273758 | A1* | 12/2005 | Long | 717/101 |
| 2006/0010195 | A1* | 1/2006 | Mamou et al. | 709/203 |
| 2006/0069717 | A1* | 3/2006 | Mamou et al. | 709/203 |
| 2006/0235733 | A1* | 10/2006 | Marks | 705/7 |
| 2007/0011126 | A1* | 1/2007 | Conner et al. | 706/47 |
| 2008/0005660 | A1* | 1/2008 | Austel et al. | 715/513 |
| 2008/0065400 | A1* | 3/2008 | Bhargava | 705/1 |
| 2009/0158237 | A1* | 6/2009 | Zhang et al. | 717/100 |
| 2009/0158240 | A1* | 6/2009 | Zhang et al. | 717/104 |

OTHER PUBLICATIONS

Anonymous; "Service-Oriented Architecture", Wikipedia, the free encyclopedia: XP002646865; Jul. 14, 2008, 15 pages.
EPO; "EPO Search report" Appl. No. 09798686.0; issued Jul. 20, 2011; 6 pages.
Notification of Transmittal of the International Search Report and the Written Opinion of the International Searching Authority or the Declaration, dated Jan. 26, 2010 from counterpart PCT application Serial No. PCT/US2009/050499 filed Jul. 14, 2009 (4 pages).
Written Opinion of the International Searching Authority, dated Jan. 26, 2010 from counterpart PCT application Serial No. PCT/US2009/050499 filed Jul. 14, 2009 (6 pages).
International Search Report, dated Jan. 26, 2010 from counterpart PCT application Serial No. PCT/US2009/050499 filed Jul. 14, 2009 (3 pages).

* cited by examiner

*Primary Examiner* — Isaac Tecklu (57) ABSTRACT

Systems and methods are defined of operating a service orientated architecture software factory system. In some embodiments these systems and methods include storing a plurality of definitions in a common definitions repository, transferring the plurality of definitions into a software factory definition layer, integrating the service orientated architecture with a software orientated architecture development environment and a registry, and creating runtime environment. In these embodiment, the runtime environment is created based upon the plurality of definitions, the software orientated architecture development environment, and the registry.

20 Claims, 5 Drawing Sheets

Figure 5

ARCHITECTURE FOR SERVICE ORIENTED ARCHITECTURE (SOA) SOFTWARE FACTORIES

TECHNICAL FIELD

Generally, the present disclosure relates to devices to software and hardware implementations of architectures for service orientated architecture (SOA) software factories.

BACKGROUND OF THE DISCLOSURE

In software engineering, software factories can be organizations structured to create software projects. Software factories can require defined product creation and management processes. Software factories can provide a cost-efficient way to reduce the time it takes to develop, create, and test software solutions.

While software factories can be used for some purposes, there is not a universal framework that allows for software created in a software factory to be integrated with any Service Oriented Architecture (SOA) deployment environment.

SUMMARY OF THE DISCLOSURE

For a more complete understanding of the present disclosure, and the advantages thereof, reference is now made to the following descriptions taken in conjunction with the accompanying drawings, wherein like numbers designate like objects, and in which:

In one embodiment, a method of operating a service orientated architecture software factory system, is disclosed that includes storing a plurality of definitions in a common definitions repository, transferring the plurality of definitions into a software factory definition layer, integrating the service orientated architecture with a software orientated architecture development environment and a registry, and creating runtime environment. In this embodiment, the runtime environment is created based upon the plurality of definitions, the software orientated architecture development environment, and the registry.

In another embodiment, a service oriented architecture software factories system is disclosed that includes a first memory, wherein the first memory comprises a common definitions repository that includes services, rules, and processes. In addition, this embodiment includes a second memory that includes a software orientated architecture development environment. Also in this embodiment is disclosed a third memory that includes a registry. In addition this embodiment discloses a processor, wherein the processor is configured to load the first memory, the second memory, and the third memory, wherein the processor creates a runtime environment. This embodiment also shows an output device, wherein the output device outputs the runtime environment.

In yet another embodiment, a service oriented architecture software factories system is disclosed that includes a business rules definition module that generates business rules and outputs the business rules to a SOA factory integration layer. Also in this embodiment is a service definition module that generates services and outputs the services to the SOA factory integration layer. In addition, a business process definition module is disclosed that outputs the business processes to the SOA factory integration layer. Also in this embodiment is a security rule definition module that generates security rules and outputs the security rules to a SOA factory integration layer. The SOA factory integration layer creates an interface specifications based upon the security rules, the business processes, the services, and the business rules. Then a SOA runtime layer that generates a runtime based upon a vendor development environment, a registry, and the interface specifications outputs the runtime.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged device. The numerous innovative teachings of the present application will be described with reference to exemplary non-limiting embodiments.

Before undertaking the DETAILED DESCRIPTION below, it can be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller can be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

Figure 1:
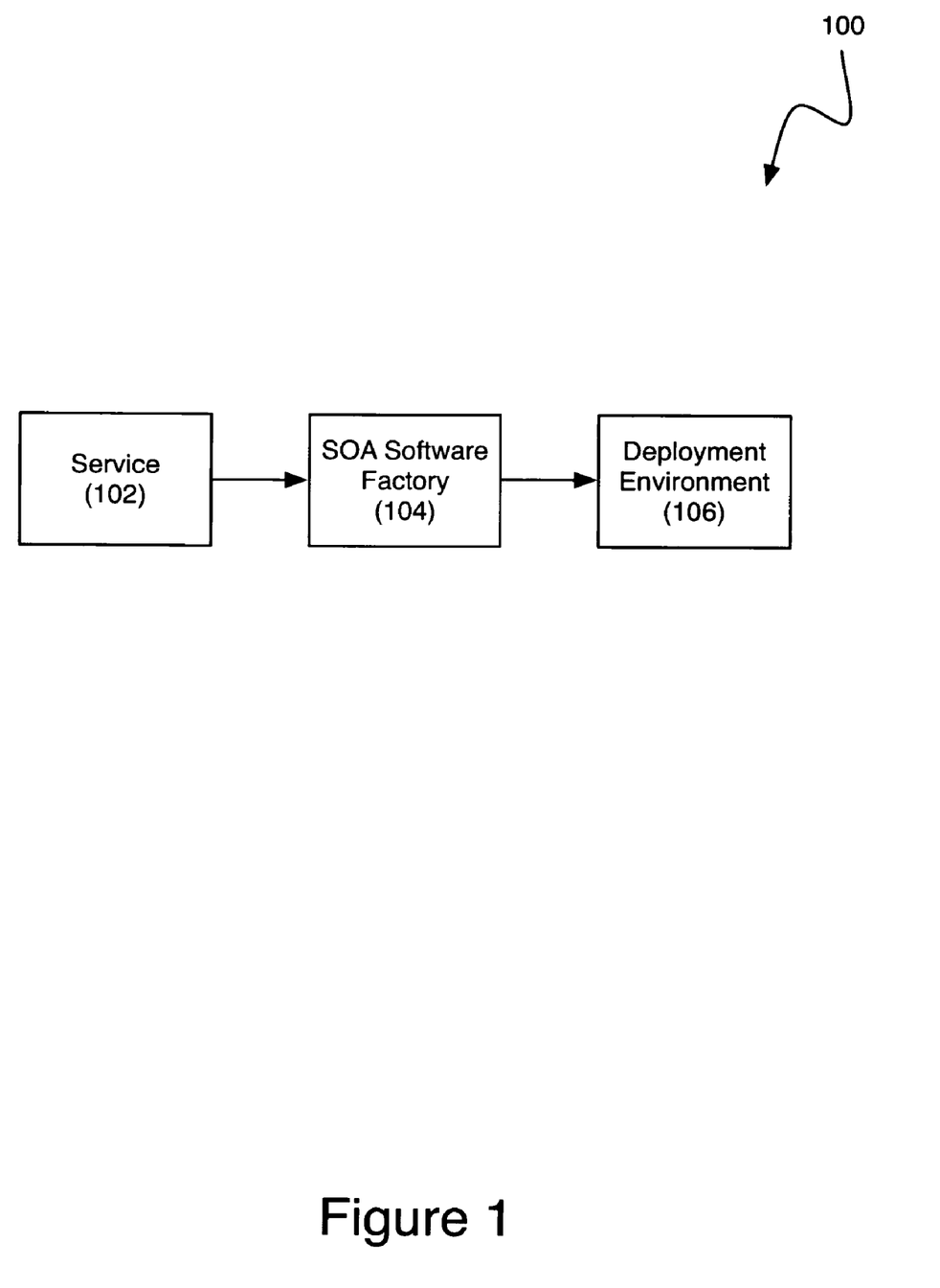
FIG. 1 is a block diagram of a high level view of a SOA software factory architecture, in accordance with a disclosed embodiment.

FIG. 1 is a block diagram of a system using a service orientated architecture (SOA) software factory architecture 100, in accordance with a disclosed embodiment. The SOA software factory architecture 100 permits the rapid development of software and uses a unified system comprising a plurality of rules, processes, and systems obtained from at least one developer. In this embodiment, a service 102 communicates with a SOA software factory 104. The service 102 can be deployed software into an environment 106 through the SOA software factory 104. The software factory 104 can comprise a plurality of modules that allow for the rapid creation, testing, and deployment of systems from the service 102 into the deployment environment 106. In addition, the SOA software factory 104 can use a third party, or vendors, business rules management system (BRMS) when deploying the service 102 into the deployment environment 106. Therefore, the SOA software factory 100 allows for the integration of the service 102 with an existing set of rules, processes, and systems already within the SOA software factory 104 to deploy the service 102 into the deployment environment 106. This allows the efficient integration of the vendor's BRMS with the SOA software factory 104 for use in a SOA runtime environment.

Figure 2:
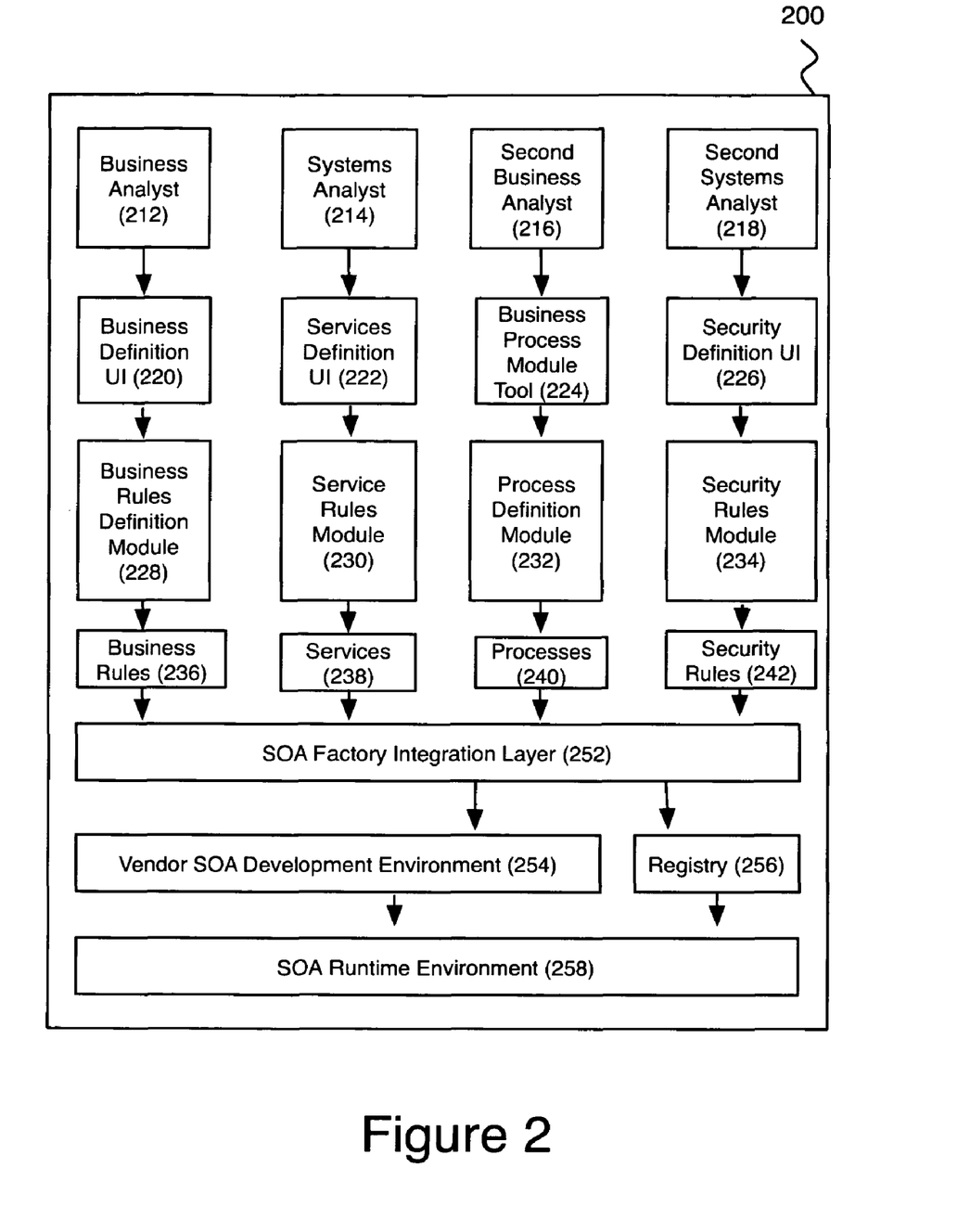
FIG. 2 is a block diagram of the SOA software factory architecture, in accordance with a disclosed embodiment.

FIG. 2 above illustrates a high level view of the SOA software factory 200, in accordance with a disclosed embodiment. In this embodiment, a first business analyst 212 provides instructions through a business rule definition user interface 220. Also in this embodiment, a system analyst 214 provides instructions to a services definition user interface 222. In addition, a second business analyst 216 provides instructions to a business process module tool 224. Also in this embodiment, a second systems analyst 218 provides instructions to a security definition user interface 226.

Through the plurality of user interfaces, information is programmed into a plurality of modules that result in the federation of business rules, security rules, services, and processes. For instance, the business rules definition user interface 220 is used to program the business rules definition module 228 that generates business rules 236. The service definition user interface 222 is used to program the service definition module 230, and the service definition module 230 is used to generate services 238. The business process module tool 224 is used to program the business process definition module 232, and the business process definition module 232 is used to generate business processes 240. In addition, a second systems analyst 218 uses the security definition user interface 226 to program the security rules module 234, and the security rules module 234 is used to generate security rules 242.

Business definitions can relate to one or more items that are defined for a predetermined business purpose. For example, a business definition can relate to a definition of a particular type of activity, establishing relationships between activities, or any other another particular business definition. Business definitions can also be used to define activities, goals, purposes. In addition, business definitions can be used to identify conflicting activities, goals, or purposes.

The business rules definition module 228 manages the definition and generation of business rules and interfaces with a common definitions repository (CDR) to store such definition specifications.

Services definitions can relate to one or more services that are defined to carry out a business task. For example, a service definition can include a list of services that are available, the scope of those services, and any other information relating to the capability of those services.

Services definition module 230 manages the definition and generation of web services specifications based on the WSDL and UDDI specifications, and interfaces with a common definitions repository to store such definition specifications along with their relationships to business rules and security rules definitions also stored in the repository.

Business process can relate to how a particular business task can be carried out. An example of a business process definition is a list of steps that are required to complete a particular business goal.

Business process definition module 232 manages the definition and generation of business process specifications based on the Business Process Modeling Notation (BPMN) and Web Services Business Process Execution Language (WS-BPEL) standards, and interfaces with a common definitions repository to store such definition specifications along with their relationships to web services, business rules, and security rules definitions also stored in the repository.

Security rules may be limitations upon who and what can access certain information within a runtime. In addition, the security rules may further limit who and what can make changes to data being used in the runtime, and may set out the parameters for what type of security should be used in the runtime.

Security rules definition module 234 manages the definition and generation of security rules and policies based on the WS-Security standards, and interfaces with a common definitions repository to store such definition specifications.

Business processes use services, business rules, and security rules as needed in order to define processes that execute real business applications in the SOA runtime environment. Business processes orchestrate services together in new ways to get things done. The emergence of XML based standards for SOA environments allow an architecture wherein SOA software factory tools can define and generate complete interface specifications, send them to integrated vendor specific development environments, where implementations can be generated, coded, tested and deployed to targeted SOA runtime environments. Once deployed into the executable SOA runtime environment, business processes and services are orchestrated together to build composite applications, which are usually put together in portals for use in the enterprise.

The security definition user interface 226 is used to program the security rules definition module 234, and the security rules definition module 234 is used to generate security rules 242. In each of the rules, processes, and services can be formatted in one or more of the following formats: The Extensible Markup Language (XML), Web Service Definition Language (WSDL), Universal Description, Discovery and Integration (UDDI), Web Services Business Process Execution Language (WS-BPEL), or Web Services Security (WSS).

A SOA factory integration layer 252 is configured to accept input from the business rules 236, the services 238, the business processes 240, and the security rules 242. The SOA factory integration layer 252 then uses a vendor SOA development environment 254 and the enterprise web services registry 256 to create a SOA runtime environment 258.

It is understood that one or more conflicts in input may occur during the creation of the SOA runtime environment 258. In such a case, the SOA factory integration layer 252 can make a determination as to either accept the input from the vendor SOA development environment 254, input from the business rules 236, the generate services 238, the business processes 240, and the security rules 242, or return an error. It is understood that this determination may be made based upon the individual parameter, and is selectable by the SOA factory integration layer 252. Moreover, it is understood that the vendor SOA development environment 254 may have a "mandatory" flag attached to the conflicting input. In such a case, the SOA factory integration layer 252 can attempt to use the input from the vendor SOA development environment 254. In a case where the conflicting input has an "optional" flag, the SOA factory integration layer 252 can ignore the conflicting input.

The SOA runtime 258 allows for the seamless integration of the vendor SOA development environment with the definitions within the SOA software factory 200. This allows for a vendor, who may provide a particular service, such as human resources, to plug directly into the SOA software factory 104 to deploy those services into the SOA runtime environment. This seamless integration of the service 102 into the deployment environment 106 through the software factory 104 allows for the rapid deployment of the service 102. Therefore, the human resources component of a vendor could be used without the need to manually recode the vendor or the deployment environment system. Use of an integration layer allows for seamless integration with multiple targeted vendor specific development and runtime environments, web services registries and Business Rules Management Systems (BRMS).

Figure 3:
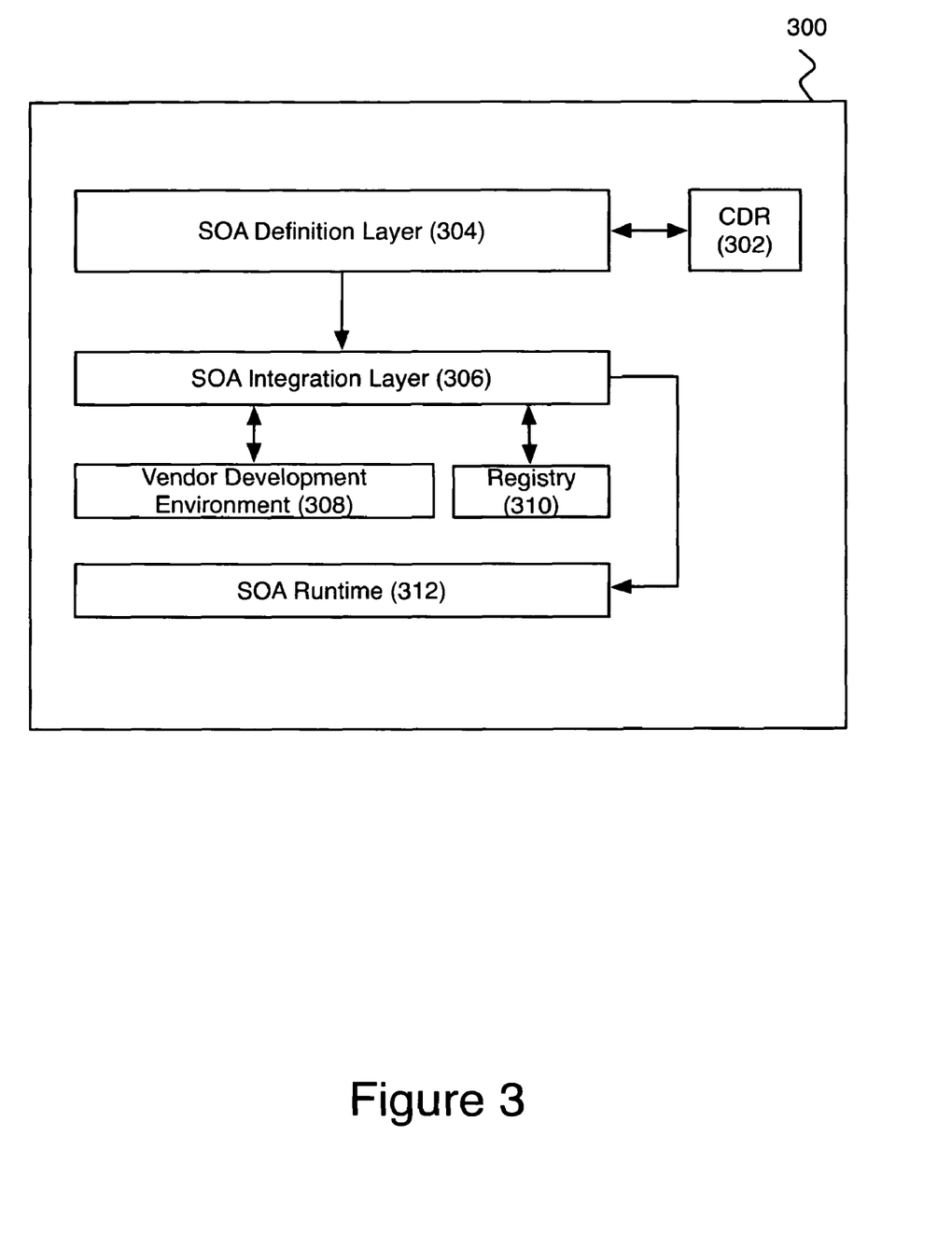
FIG. 3 is a block diagram of the core SOA software factory architecture, in accordance with a disclosed embodiment.

FIG. 3 is a block diagram 300 of the core of the SOA software factory architecture, according to one disclosed embodiment. Block diagram 300 shows a common definitions repository (CDR) 302 that keeps track of all definitions, business rules, business processes and security rules used in a SOA factory definition layer 304. In addition, CDR 302 comprises models and relationships between services used in the SOA factory definition layer 304. The SOA factory definition layer 304 can be made up of several independent schemas, representing the four basic modules and schemas to represent relationships of entities between the modules. All XML generation is done directly from the definitions contained in the repository. A UI is setup to allow a user to setup an XML generation job, specifying what definitions in the repository are to be generated. In the example shown in FIG. 3, elements which have been already programmed into SOA software factory 300 are reused through CDR 302, eliminating the need to manually program business rules 236, services 238, processes 240, and security rules 242.

CDR 302 can store all services, business process, business rules, and security rules definitions that contain all of the specified relationships to each other and are used to generate Business Rules, WSDL, UDDI, WS-BPEL, and WS-Security specifications.

The present disclosure allows for the use of a single, unified standard for business rules definition. Vendors define business rules with XML and some with WSDL where business rules are exposed as web services. By using vendor specific adapters SOA software factories are able to generate the appropriate XML and WSDL for the targeted environment. The SOA software factory will, through the SOA factory integration layer 306, allow integration of the factory to a chosen vendor's Business Rules Management System (BRMS) for use in the SOA runtime environment 312 by the business processes and services that were defined in CDR 302.

The SOA factory integration layer 306 is configured to accept input from the SOA definition layer 304, a vendor SOA development environment 308 and the enterprise web services registry 310 to create the SOA runtime environment 312. The SOA factory integration layer 306, SOA definition layer 304, the vendor SOA development environment 308, and the enterprise web services registry 310 can be stored in a single memory device or a plurality of memory devices.

Through the configuration shown in FIG. 3, a number of the steps required in FIG. 2 have been removed. These steps, requiring a plurality of analysts, user interfaces, modules, and rules have been replaced by a single CDR 302. These definitions allow for the rapid deployment of software using a vendor development environment by using definitions that have previously been established.

It is understood that the user can define new Web services in the Business Process Definition module upon the discovery of the need for new Web services. These new web services are propagated to the Web service definitions to the Web Service Definition module through the Common Definitions Repository. Web services defined in this manner will be immediately available for use in the business processes being defined as well as in any other business process defined in the SOA Factory environment.

For web services, the common standard for service definition language is WSDL and for discovery of services, UDDI, both are XML based definition standards. WSDL can be imported into any of the leading vendor's development environments, code can be generated and services can be deployed to the specific SOA runtime environment. If the enterprise employs a common web services registry, UDDI XML can be generated and imported into the registry in order to provide discovery of any web services that can be used/reused in the enterprise. Once web services are defined in the software factory environment, security rules can be applied to them as necessary to provide for appropriate service level security in the runtime environment. Generated web services definitions are sent, through the SOA Factory Integration Layer, to the chosen vendor specific development environment. Web services implementations are then generated, coded, tested and then deployed to the targeted SOA runtime environment.

It is understood that XML based definition languages for business process definition include WS-BPEL and BPMN. These definition languages allow web services to work together to create processes that address real business applications of web services. BPEL services can invoke business rules in a rules engine in order to make decisions during the processing flow of particular business processes. By keeping business rules separate from business processes it is possible to avoid "hiding" real business rules inside of business processes and they can be modified independently of any business processes using them.

In addition, security rules can be applied to BPEL services as necessary to provide for appropriate security of business processes in the environment. The embodiments described herein allows for any vendor's business process modeling tool to be used in the model definition environment, even if the deployment environment is of a different vendor. By doing so, a model driven development paradigm is supported in the software factory environment.

With emergence of the BPMN standard, business process modeling notation can have a standard in the future for a common way of graphically modeling business processes. BPMN allows a formal mapping to WS-BPEL; however, the mapping is not currently complete. Until a complete formal mapping is provided the Business Process Definition module will fill in the gaps when WS-BPEL is generated from any BPMN compliant models.

As mentioned above, there is an XML based web services security definition standard named WS-Security or WSS. Security rules and policies defined in the software factory environment and stored in the common definitions repository can be exported as WSS XML to any SOA environment. In addition, the present disclosure allows security rules to be defined and to be applied to services. The embodiments described herein also gives the enterprise an opportunity to have one common SOA definitions repository so that services and business processes that support a particular business function can be defined once, regardless of how many different vendor specific platforms can be employed in the enterprise, thus maximizing ROI for the enterprise through reuse and elimination of redundant processes throughout.

Figure 4:
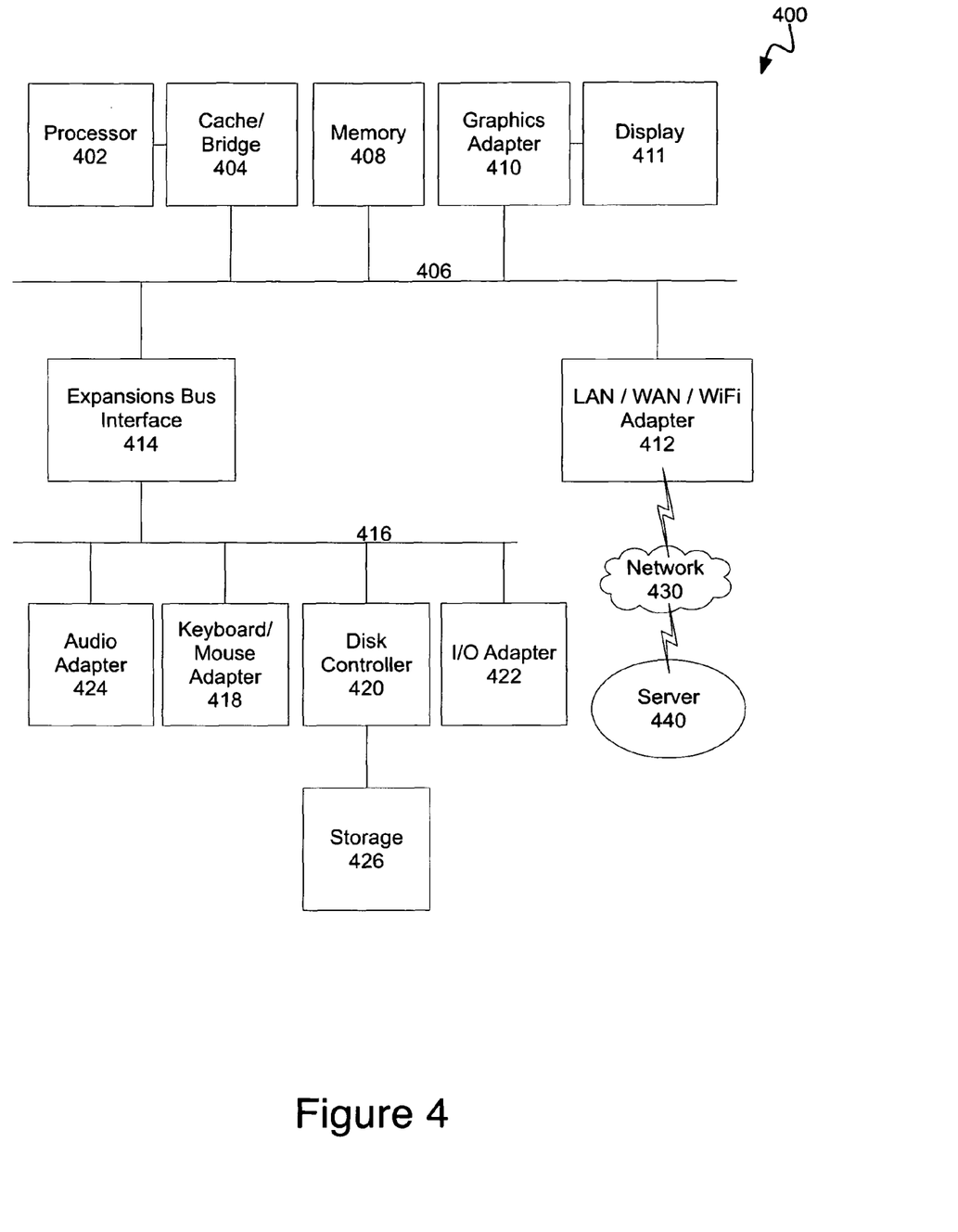
FIG. 4 is a block diagram of a general-purpose computer system capable of implementing one of the embodiments of the present disclosure, in accordance with a disclosed embodiment.

FIG. 4 depicts a block diagram of a data processing system in which an embodiment can be implemented. This data processing system may be implemented as part or the whole SOA software factory. It is understood that the data processing system may be used as a server or a client of one or more components of the SOA software factory. The data processing system depicted includes a processor 402 connected to a level two cache/bridge 404, which is connected in turn to a local system bus 406. Local system bus 406 can be, for example, a peripheral component interconnect (PCI) architecture bus. Also connected to local system bus in the depicted example are a main memory 408 and a graphics adapter 410. The graphics adapter 410 can be connected to display 411.

Other peripherals, such as local area network (LAN)/Wide Area Network/Wireless (e.g. WiFi) adapter 412, can also be connected to local system bus 406. Expansion bus interface 414 connects local system bus 406 to input/output (I/O) bus 416. I/O bus 416 is connected to keyboard/mouse adapter 418, disk controller 420, and I/O adapter 422. Disk controller 420 can be connected to a storage 426, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 416 in the example shown is audio adapter 424, to which speakers (not shown) can be connected for playing sounds. Keyboard/mouse adapter 418 provides a connection for a pointing device (not shown), such as a mouse, trackball, trackpointer, etc.

Those of ordinary skill in the art will appreciate that the hardware depicted in FIG. 4 can vary for particular. For example, other peripheral devices, such as an optical disk drive and the like, also can be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface can be manipulated by a user through the pointing device. The position of the cursor can be changed and/or an event, such as clicking a mouse button, generated to actuate a desired response.

One of various commercial operating systems, such as a version of Microsoft Windows™, a product of Microsoft Corporation located in Redmond, Wash. can be employed if suitably modified. The operating system is modified or created in accordance with the present disclosure as described.

LAN/WAN/Wireless adapter 412 can be connected to a network 430 (not a part of data processing system 400), which can be any public or private data processing system network or combination of networks, as known to those of skill in the art, including the Internet. Data processing system 400 can communicate over network 430 with server system 440, which is also not part of data processing system 400, but can be implemented, for example, as a separate data processing system 400.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 400 can conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of instruction or signal bearing medium utilized to actually carry out the distribution. Examples of machine usable or machine readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Figure 5:
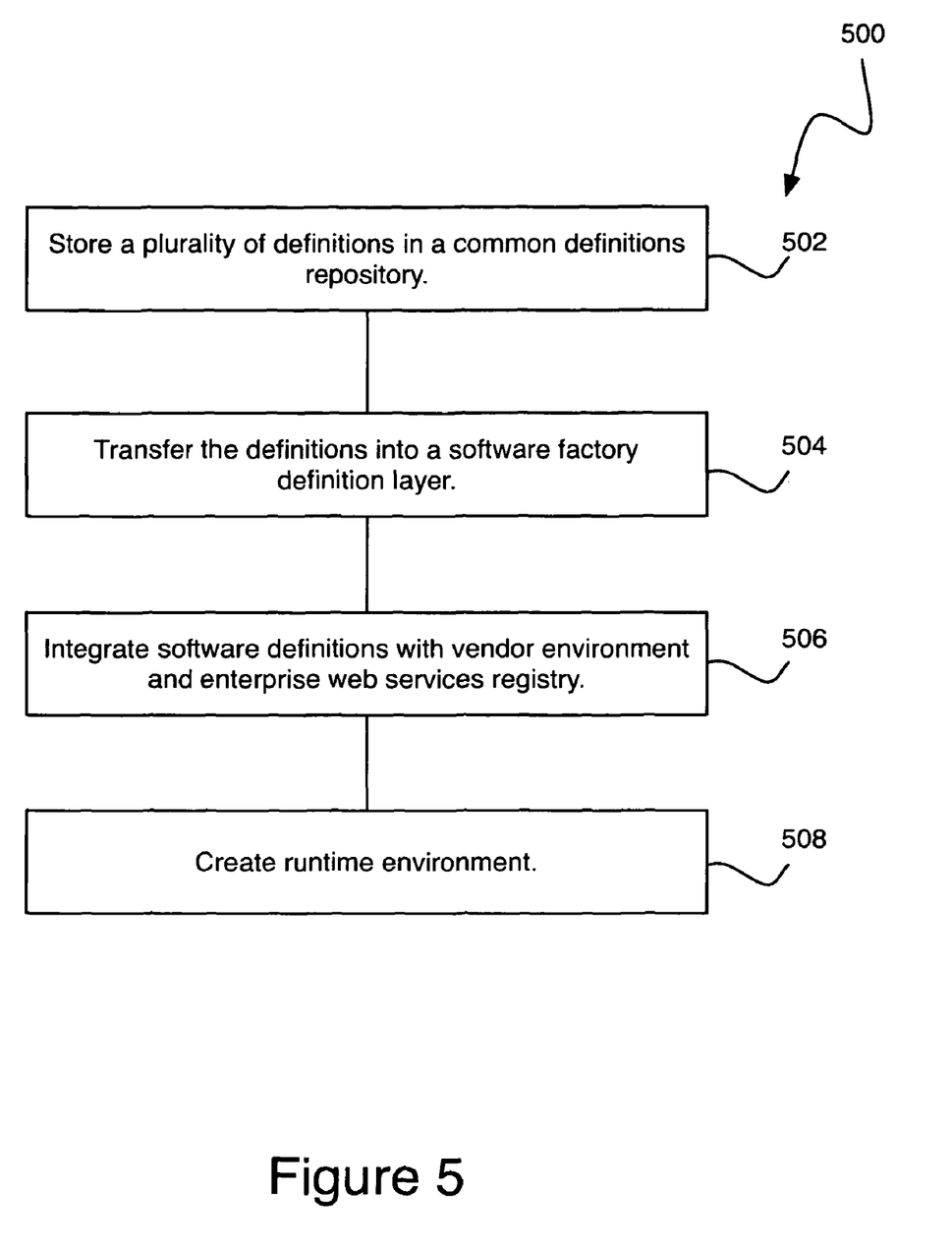
FIG. 5 is a flowchart of one method of using the SOA software factory architecture, in accordance with a disclosed embodiment.

FIG. 5 is one method 500 of using the SOA software factory architecture. In block 502, the method stores a plurality of definitions in a common definitions repository. In block 504, the method transfers the definitions into a software factory definition layer. In block 506, integrate software definitions with vendor environment and enterprise web services registry. Finally, in block 508 a runtime environment is created and stored on a computer readable medium.

Although an exemplary embodiment of the present disclosure has been described in detail, those skilled in the art will understand that various changes, substitutions, variations, and improvements disclosed herein can be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method of operating a service orientated architecture software factory system, comprising:
   storing a plurality of definitions in a common definitions repository;
   transferring the plurality of definitions in the common definition repository into a software factory definition layer;
   integrating the service orientated architecture with a software orientated architecture development environment and a registry, wherein the definitions are defined by a first provider and the software oriented architecture development environment is defined and deployed directly to an integration layer by a second provider, wherein the integration layer resolves any conflicts between the definitions of the software factory definition layer and the software oriented architecture development environment defined and directly deployed by the second provider;

creating a runtime environment, wherein the runtime environment is created based upon the plurality of definitions, the software orientated architecture development environment, and the registry; and storing the runtime on a computer readable medium.

2. The method of claim 1, wherein the common definitions repository comprises information related to definitions, models, and rules.

3. The method of claim 2, wherein the rules comprise business rules and security rules.

4. The method of claim 2, wherein the definitions comprise a plurality of business process definitions.

5. The method of claim 1, wherein the common definitions repository is configured to generate XML.

6. The method of claim 1, wherein the software orientated architecture development environment is a vendor specific architecture.

7. The method of claim 1, wherein the common definitions repository stores information in a business process modeling notation (BPMN) format.

8. The method of claim 1, wherein the plurality of definitions are selected from the group of services, business rules, and security rules.

9. A service oriented architecture software factories system, comprising:

a common definitions repository, wherein the common definitions repository comprises services, rules, and processes defined by a first provider;

a software orientated architecture development environment coupled to the common definitions repository, wherein the software orientated architecture development environment is defined and deployed directly to an integration layer by a second provider;

a registry coupled to the common definitions repository;

a processor, wherein the processor is configured to load the common definitions repository, the software orientated architecture development environment, and the registry, wherein the processor creates a runtime environment based on conflict solution by the integration layer and according to the common definitions repository, the software orientated architecture development environment, and the registry; and an output device, wherein the output device outputs the runtime environment.

10. The system of claim 9, wherein the output device stores the runtime environment onto a computer readable medium.

11. The system of claim 9, wherein the rules comprise business rules and security rules.

12. The system of claim 9, wherein the first memory stores information in the XML format.

13. A service oriented architecture (SOA) software factories system, comprising:

a business rules definition module that generates business rules and outputs the business rules to a SOA factory integration layer;

a service definition module that generates services and outputs the services to the SOA factory integration layer;

a business process definition module that generates business processes, and outputs the business processes to the SOA factory integration layer;

a security rule definition module that generates security rules and outputs the security rules to the SOA factory integration layer, wherein the SOA factory integration layer creates an interface specifications based upon the security rules, the business processes, the services, and the business rules;

a SOA runtime layer that generates a runtime based upon conflict resolution by the integration layer given a vendor development environment, a registry, and the interface specifications, wherein the interface specifications are defined by a first provider and the vendor development environment is defined and directly deployed by a second provider; and an output device that outputs the runtime onto a computer readable medium.

14. The system of claim 13, wherein the business rules are generated in a format selected from the list comprising of: extensible markup language (XML), web service definition language (WSDL), and universal description discovery and integration (UDDI).

15. The system of claim 13, wherein the business processes are generated in a format selected from the list comprising of: web services business process execution language (BS-BPEL), web service definition language (WSDL), and universal description discovery and integration (UDDI).

16. The system of claim 13, wherein the security rules are generated in the web service security (WSS) format.

17. The system of claim 13, further comprising a business definition user interface to input parameters into the business rules definition module.

18. The system of claim 13, further comprising a services definition user interface to input parameters into the services rules definition module.

19. The system of claim 13, further comprising a business process user interface to input parameters into the business processes definition module.

20. The system of claim 13, further comprising a security definition user interface to input parameters into the security rules definition module.

* * * * *

UNITED STATES PATENT AND TRADEMARK OFFICE
CERTIFICATE OF CORRECTION

PATENT NO.         : 8,413,107 B2
APPLICATION NO.    : 12/218469
DATED              : April 2, 2013
INVENTOR(S)        : Cecil A. Brininstool et al.

It is certified that error appears in the above-identified patent and that said Letters Patent is hereby corrected as shown below:

In the Claims:

In column 9, line 43, in Claim 9, delete "solution" and insert -- resolution --, therefor.

In column 10, line 35, in Claim 15, delete "(BS-" and insert -- (WS- --, therefor.

Signed and Sealed this
Sixth Day of August, 2013

Teresa Stanek Rea
*Acting Director of the United States Patent and Trademark Office*